United States Patent
Lee et al.

(10) Patent No.: US 9,646,768 B2
(45) Date of Patent: May 9, 2017

(54) CHIP COMPONENT

(71) Applicant: SAMSUNG ELECTRO-MECHANICS CO., LTD., Suwon-Si, Gyeonggi-Do (KR)

(72) Inventors: Sun Cheol Lee, Suwon-Si (KR); Seung Yul Lee, Suwon-Si (KR); Bok Goo Heo, Suwon-Si (KR); Kyung Pyo Hong, Suwon-Si (KR); Min Hyang Kim, Suwon-Si (KR); Kyoung Hoon Kim, Suwon-Si (KR); Hyoung Wook Lim, Suwon-Si (KR); Sang Hyun Park, Suwon-Si (KR); Mi Ok Park, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 26 days.

(21) Appl. No.: 14/677,639

(22) Filed: Apr. 2, 2015

(65) Prior Publication Data

US 2016/0111216 A1 Apr. 21, 2016

(30) Foreign Application Priority Data

Oct. 15, 2014 (KR) .................. 10-2014-0139247

(51) Int. Cl.
*H01G 4/30* (2006.01)
*H01G 4/005* (2006.01)
(Continued)

(52) U.S. Cl.
CPC ............... *H01G 4/30* (2013.01); *H01G 4/012* (2013.01); *H01G 4/232* (2013.01); *H01G 4/1227* (2013.01)

(58) Field of Classification Search
CPC ....................................................... H01G 4/30
(Continued)

(56) References Cited

U.S. PATENT DOCUMENTS

| 7,394,646 B2 * | 7/2008 | Tonogai | H01G 4/30 361/303 |
| 8,531,817 B2 * | 9/2013 | Yoshida | H01C 1/1406 361/303 |

(Continued)

FOREIGN PATENT DOCUMENTS

| JP | 09129476 A | * | 5/1997 |
| JP | 2002015940 A | * | 1/2002 |

(Continued)

*Primary Examiner* — Eric Thomas
(74) *Attorney, Agent, or Firm* — McDermott Will & Emery LLP

(57) ABSTRACT

A chip component includes: a ceramic body including a capacitance forming part in which first and second dielectric layers are alternately disposed; and external electrodes disposed on both end surfaces of the ceramic body, wherein the capacitance forming part includes first and second internal electrodes spaced apart from each other on the first dielectric layers and exposed to the end surfaces of the ceramic body to thereby be connected to the external electrodes; and floating electrodes disposed on the second dielectric layers and overlapped with portions of the first and second internal electrodes, the ceramic body includes protective parts disposed between upper and lower surfaces thereof and the capacitance forming part and having third dielectric layers on which first and second dummy electrodes exposed to the end surfaces of the ceramic body are disposed, and the protective parts include third dummy electrodes disposed between the first and second dummy electrodes.

15 Claims, 6 Drawing Sheets

A-A'

(51) Int. Cl.
    *H01G 4/012*    (2006.01)
    *H01G 4/232*    (2006.01)
    *H01G 4/12*     (2006.01)

(58) Field of Classification Search
    USPC .............................................. 361/301.4, 303
    See application file for complete search history.

(56) References Cited

U.S. PATENT DOCUMENTS

| | | | |
|---|---|---|---|
| 2007/0025054 A1* | 2/2007 | Tonogai | ................... H01G 4/30 |
| | | | 361/303 |
| 2010/0220426 A1 | 9/2010 | Shimizu | |
| 2013/0033154 A1 | 2/2013 | Sakuratani et al. | |

FOREIGN PATENT DOCUMENTS

| | | | |
|---|---|---|---|
| JP | 2002075780 A | * | 3/2002 |
| JP | 4929487 B2 | | 5/2012 |
| JP | 2013/0033154 A | | 3/2013 |
| JP | 2013-093374 A | | 5/2013 |

* cited by examiner

CHIP COMPONENT

CROSS-REFERENCE TO RELATED APPLICATION

This application claims the priority and benefit of Korean Patent Application No. 10-2014-0139247 filed on Oct. 15, 2014, with the Korean Intellectual Property Office, the disclosure of which is incorporated herein by reference.

BACKGROUND

The present disclosure relates to a chip component.

In accordance with the miniaturization, slimming, and multifunction of electronic products, the miniaturization of chip components has been demanded, and electronic components having reduced sizes have also been mounted at high integration schemes. In accordance with this trend, spaces between the mounted electronic components have been significantly decreased.

A multilayer ceramic capacitor, an electronic component, is a chip type condenser, commonly mounted on the printed circuit boards of various electronic products such as an image display devices, including liquid crystal displays (LCDs), plasma display panels (PDPs), and the like, as well as computers, personal digital assistants (PDA), cellular phones, and the like, serving to charge electricity therein and discharge electricity therefrom. A multilayer ceramic capacitor (MLCC) may be used as a component of various electronic apparatuses due to inherent advantages thereof, such as small size, high capacitance, and ease of mounting.

In the case of multilayer ceramic capacitors having characteristics such as high withstand voltage and low capacitance, among several types of multilayer ceramic capacitor, a design of an internal electrode structure using floating electrodes has mainly been used in order to obtain such characteristics.

[Related Art Document]
(Patent Document 1) Japanese Patent No. 4929487

SUMMARY

An aspect of the present disclosure may provide a chip component having high capacitance and secured warpage strength by including a capacitance forming part including floating electrodes and protective parts having dummy electrodes formed in a central portion of a ceramic body in a length direction thereof.

According to an aspect of the present disclosure, a chip component may include: a ceramic body including a capacitance forming part in which a plurality of first and second dielectric layers are alternately disposed; and external electrodes disposed on both end surfaces of the ceramic body in a length direction thereof, wherein the capacitance forming part includes first and second internal electrodes disposed on the plurality of first dielectric layers to be spaced apart from each other and exposed to the end surfaces of the ceramic body to thereby be connected to the external electrodes; and floating electrodes disposed on the plurality of second dielectric layers and overlapped with portions of the first and second internal electrodes, the ceramic body further includes protective parts disposed between at least one of upper and lower surfaces of the ceramic body and the capacitance forming part and having a plurality of third dielectric layers on which first and second dummy electrodes exposed to the end surfaces of the ceramic body are disposed, and the protective parts further include third dummy electrodes disposed between the first and second dummy electrodes.

According to another aspect of the present disclosure, a chip component may include: a ceramic body including a capacitance forming part in which a plurality of first and second dielectric layers are alternately disposed and first and second protective parts respectively disposed on one surface and the other surface of the capacitance forming part in a thickness direction thereof; first and second external electrodes disposed on both end surfaces of the ceramic body in a length direction thereof, respectively; first and second internal electrodes disposed on the plurality of first dielectric layers and exposed to the end surfaces of the ceramic body to thereby be connected to the first and second external electrodes, respectively; and floating electrodes disposed on the plurality of second dielectric layers and positioned in a central portion of the ceramic body in the length direction thereof to thereby be overlapped with portions of the first and second internal electrodes, wherein the first and second protective parts include a plurality of third dielectric layers on which first dummy electrodes positioned in the central portion of the ceramic body in the length direction thereof are disposed, the first dummy electrodes being overlapped with portions of the floating electrodes.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
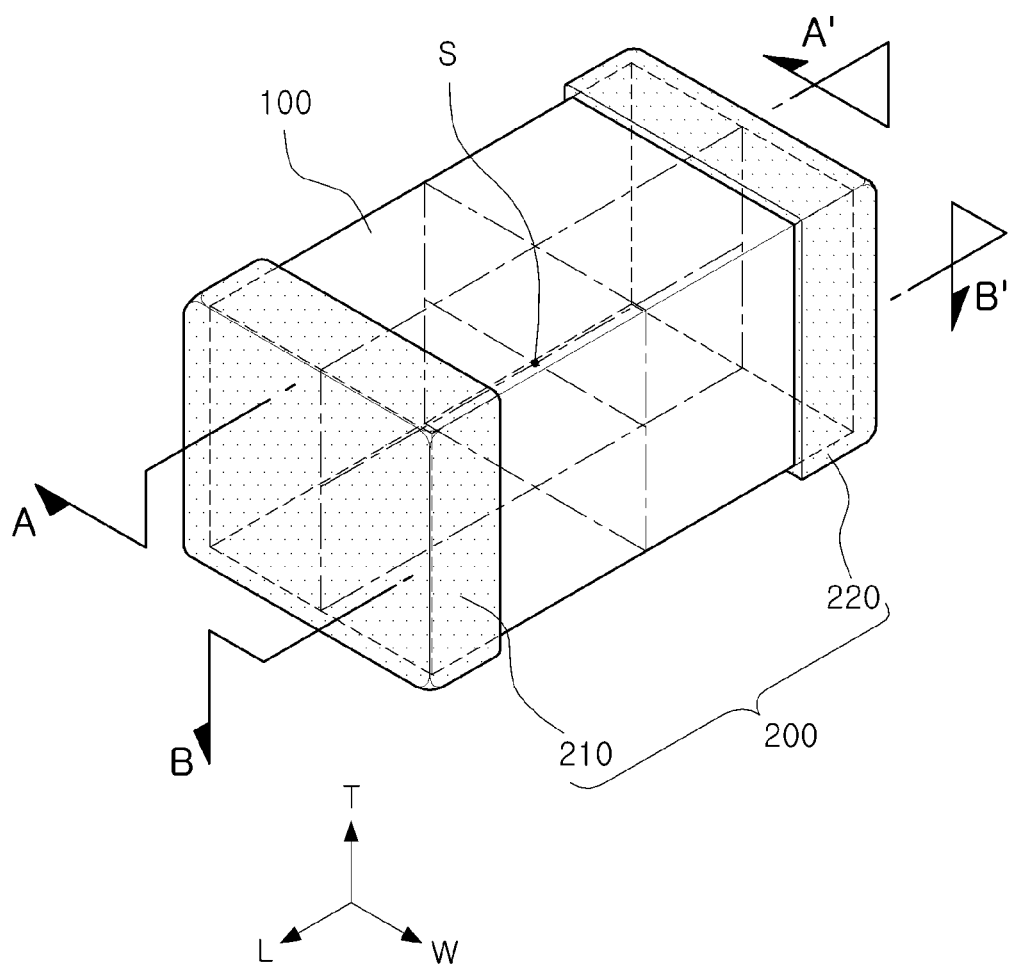
FIG. 1 is a perspective view of a chip component according to an exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Meanwhile, an example of a chip component may generally include a capacitor, an inductor, a piezoelectric element, a varistor, a thermistor, or the like. Hereinafter, in an exemplary embodiment of the present disclosure, a multilayer ceramic capacitor will be described as an example of the chip component. However, the chip component according to an exemplary embodiment of the present disclosure is not limited to the multilayer ceramic capacitor.

FIG. 1 is a perspective view of a chip component according to an exemplary embodiment of the present disclosure.

Figure 2:
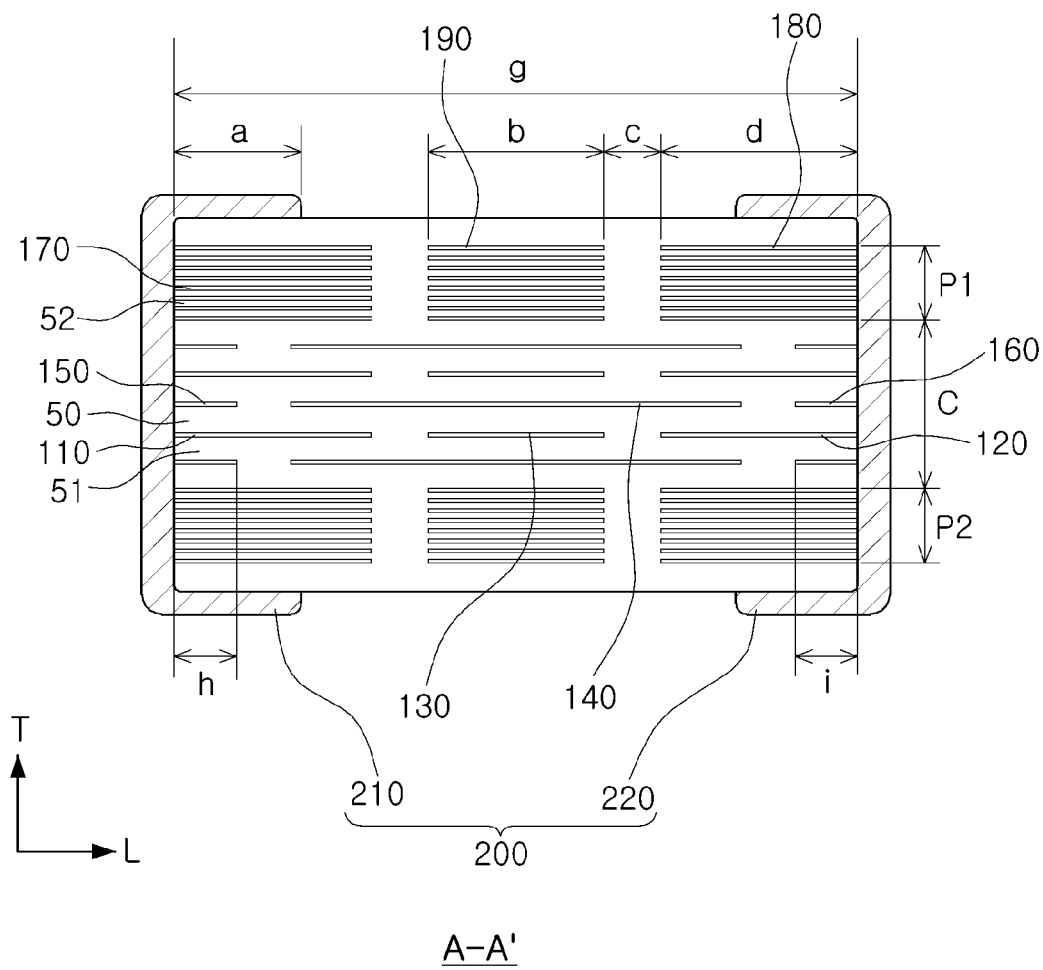
FIG. 2 is a cross-sectional view of the chip component taken along line A-A' of FIG. 1.

FIG. 2 is a cross-sectional view of the chip component taken along line A-A' of FIG. 1.

Referring to FIGS. 1 and 2, the chip component according to the exemplary embodiment of the present disclosure may include a ceramic body 100 and external electrodes 200.

The ceramic body 100 may be formed by stacking a plurality of dielectric layers 50 to 53 (See FIG. 5) in a thickness direction of the ceramic body 100 and then sintering the plurality of dielectric layers 50 to 53. Adjacent dielectric layers may be integrated with each other so that boundaries therebetween are not readily apparent without using a scanning electron microscope (SEM). Here, the ceramic body 100 may have a hexahedral shape.

Directions of the ceramic body 100 will be defined in order to clearly describe exemplary embodiments of the present disclosure. L, W and T illustrated in FIG. 1 refer to a length direction, a width direction, and a thickness direction, respectively. In addition, the ceramic body 100 may have a lower surface provided as a mounted surface, an upper surface opposing the lower surface, both end surfaces in the length direction, and both side surfaces in the width direction.

Referring to FIG. 2, the ceramic body 100 may include a capacitance forming part C formed by alternately disposing a plurality of first and second dielectric layers 50 and 51. In addition, the ceramic body 100 may include protective parts P1 and P2 disposed between at least one of the upper and lower surfaces thereof and the capacitance forming part C and including a plurality of third dielectric layers 52.

Here, the number of protective parts P1 and P2 and thicknesses of the protective parts P1 and P2 are not limited to those illustrated in FIG. 2. Hereinafter, the protective part P1 disposed between the upper surface of the ceramic body 100 and the capacitance forming part C will be called a first protective part, and the protective part P2 disposed between the lower surface of the ceramic body 100 and the capacitance forming part C will be called a second protective part.

The first to third dielectric layers 50 to 52 may be formed of a dielectric material, and may improve a capacitance of the multilayer ceramic capacitor. The first to third dielectric layers 50 to 52 may contain a high-k ceramic material, for example, barium titanate ($BaTiO_3$) based ceramic powders, or the like. However, the present inventive concept is not limited thereto as long as a sufficient capacitance may be obtained.

In addition, the first to third dielectric layers 50 to 52 may further contain various kinds of ceramic additives such as a transition metal oxide or carbide, rare earth elements, magnesium (Mg), aluminum (Al), or the like, organic solvents, plasticizers, binders, dispersants, and the like, if necessary, in addition to the ceramic powder.

The capacitance forming part C may be formed by alternately disposing the plurality of first and second dielectric layers 50 and 51.

Referring to FIG. 2, first and second internal electrodes 110 and 120 may be disposed on the plurality of first dielectric layers 50 so as to be exposed to the outside through both end surfaces of the ceramic body 100 in the length direction thereof, respectively. The first and second internal electrodes 110 and 120 may have different polarities, and be disposed on one first dielectric layer 50 so as to be spaced apart from each other.

Meanwhile, the capacitance forming part C may further include third internal electrodes 130 disposed on the plurality of first dielectric layers 50 so as to be spaced apart from the first and second internal electrodes 110 and 120 between the first and second internal electrodes 110 and 120. The third internal electrodes 130 may be positioned in the central portion S (See FIG. 1) of the ceramic body 100 in the length direction thereof.

In addition, the third internal electrodes 130 may be spaced apart from the first and second internal electrodes 110 and 120 by a predetermined distance c. However, the third internal electrodes 130 are not limited to those illustrated in FIGS. 1 and 2. In addition, distances by which the third internal electrodes 130 are spaced apart from the first and second internal electrodes 110 and 120 do not need to be the same as each other.

In addition, the first to third internal electrodes 110 to 130 may be formed of a conductive material, for example, any one of silver (Ag), lead (Pb), platinum (Pt), nickel (Ni), and copper (Cu) or an alloy thereof, but are not limited thereto.

Meanwhile, floating electrodes 140 may be formed on the plurality of second dielectric layers 51 so as to be overlapped with portions of the first and second internal electrodes 110 and 120.

In more detail, the floating electrodes 140 may be formed in the ceramic body 100 so as not to be exposed to the outside of the ceramic body 100, and may have a width that is the same as that of the first and second internal electrodes 110 and 120. A detailed description therefor will be provided below with reference to FIGS. 3A and 3B.

Meanwhile, the floating electrodes 140 may decrease a voltage acting on the first and second internal electrodes 110 and 120. Therefore, withstand voltage characteristics may be improved, and the numbers of stacked first and second internal electrodes 110 and 120 may be increased as long as dielectric breakdown does not occur.

In addition, in the capacitance forming part C, a capacitance may also be implemented in portions in which the floating electrodes 140 and the first to third internal electrodes 110 to 130 are overlapped with each other.

In terms of an equivalent circuit, it may be considered that two capacitors are connected in series with each other, and the voltage acting on the first and second internal electrodes 110 and 120 may be decreased to a half through this.

The first and second protective parts P1 and P2 may be formed by stacking the plurality of third dielectric layers 52. Here, first and second dummy electrodes 170 and 180 may be disposed on the plurality of third dielectric layers 52.

In addition, the first and second protective parts P1 and P2 may further include third dummy electrodes 190 disposed on the plurality of third dielectric layers 52 between the first and second dummy electrodes 170 and 180.

The first and second protective parts P1 and P2 may be formed by stacking the plurality of third dielectric layers 52 having the first to third dummy electrodes 170 to 190 disposed thereon in the thickness direction of the ceramic body 100.

The first to third dummy electrodes 170 to 190 may be formed in the same direction as a direction in which the first and second internal electrodes 110 and 120 are formed. In addition, the first to third dummy electrodes 170 to 190 may not contribute to forming a capacitance except for a parasitic capacitance generated by an influence of the external electrodes 200 disposed on both end surfaces of the ceramic body 100 in the length direction thereof or the capacitance forming part C.

Particularly, the third dummy electrodes 190 may be disposed on the third dielectric layers 52 so as to be spaced apart from the first and second dummy electrodes 170 and 180 by a predetermined distance c, and may be stacked in the same direction so as to be positioned in the central portion S (See FIG. 1) of the ceramic body 100 in the length direction thereof.

The third dummy electrodes 190 may be positioned in the central portion of the ceramic body 100 in the length direction thereof to increase warpage strength, whereby a strength decrease phenomenon generated due to a step problem that may occur in a high multilayer ceramic capacitor may be prevented.

Meanwhile, a plurality of dummy electrodes may also be disposed in the capacitance forming part C.

The capacitance forming part C may further include fourth and fifth dummy electrodes 150 and 160 disposed on the plurality of second dielectric layers 51. The fourth and fifth dummy electrodes 150 and 160 may be exposed to both end surfaces of the ceramic body 100 in the length direction thereof, respectively, to thereby be electrically connected to the external electrodes 200, on the plurality of second dielectric layers 51 on which the floating electrodes 140 are formed.

The fourth and fifth dummy electrodes 150 and 160 may be overlapped with the first and second internal electrodes 110 and 120, respectively, and the floating electrodes 140 may be disposed between the fourth and fifth dummy electrodes 150 and 160 so as to be spaced apart from the fourth and fifth dummy electrodes 150 and 160 by a predetermined distance.

The fourth and fifth dummy electrodes 150 and 160 may be disposed on the first dielectric layers 50, similar to the first to third internal electrodes 110 to 130, within the capacitance forming part C.

The fourth and fifth dummy electrodes 150 and 160 may decrease vibrations generated in the external electrodes 200 disposed on the upper surface of the ceramic body 100 and decrease acoustic noise.

The external electrodes may include first and second external electrodes 210 and 220 disposed on both end surfaces of the ceramic body 100 in the length direction thereof. The first and second external electrodes 210 and 220 may be electrically connected to the first and second internal electrodes 110 and 120, respectively.

The first and second external electrodes 210 and 220 may be formed of a conductive material, for example, any one of silver (Ag), lead (Pb), platinum (Pt), nickel (Ni), and copper (Cu) or an alloy thereof. However, the present inventive concept is not limited thereto.

The first and second external electrodes 210 and 220 may be extended from both end surfaces of the ceramic body 100 in the length direction thereof to at least one of the upper and lower surfaces of the ceramic body 100 and both side surfaces of the ceramic body 100 in the width direction.

Meanwhile, a plating layer (not illustrated) may be formed on the first and second external electrodes 110 and 120, if necessary.

The plating layer may include a nickel (Ni) plating layer formed on the first and second external electrodes 110 and 120 and a tin (Sn) plating layer formed on the nickel plating layer.

The nickel plating layer and the tin plating layer may be to increase adhesion strength between the chip component according to the present disclosure and a printed circuit board when the chip component is mounted on the printed circuit board, or the like, using a solder. Here, plating for forming the nickel plating layer and the tin plating layer may be performed by a known method. As an example, lead-free plating may be performed. However, the present inventive concept is not limited thereto.

Figure 3A:
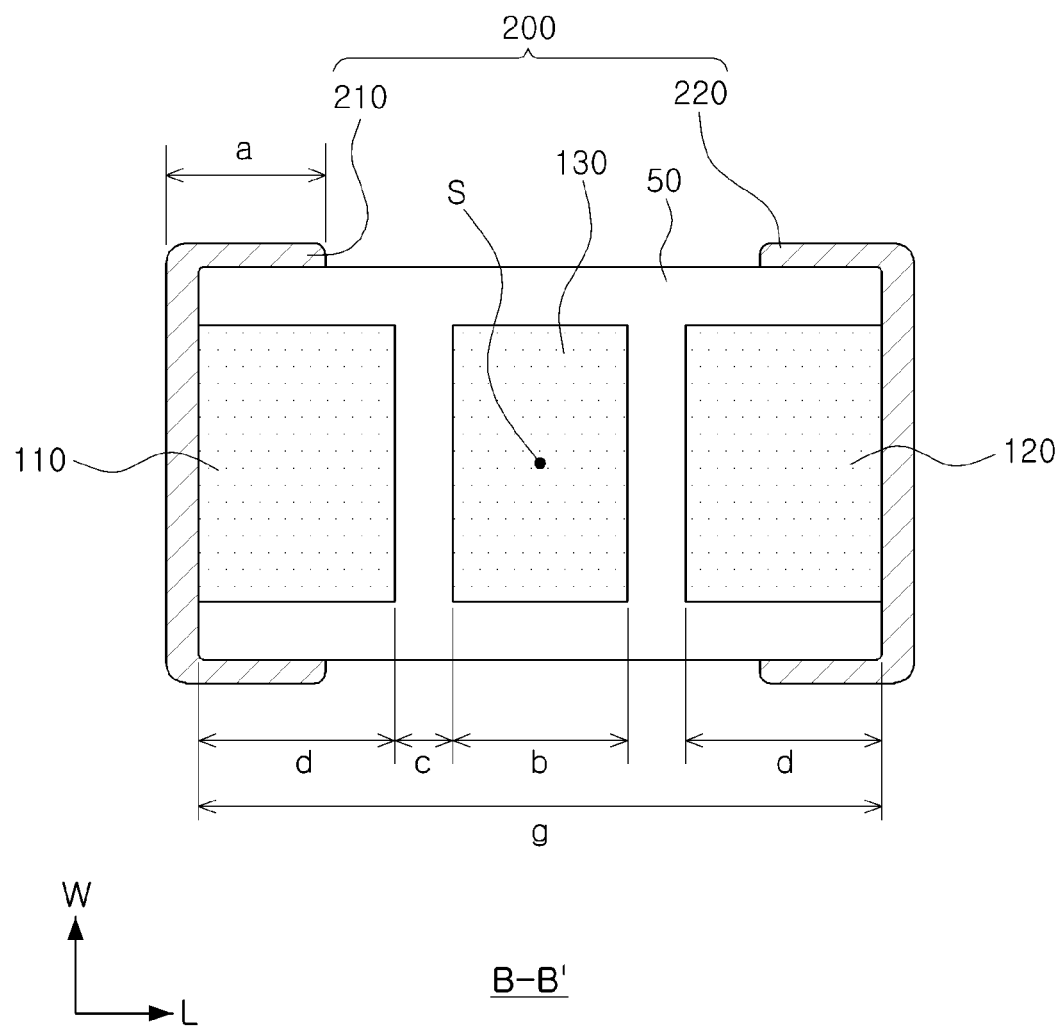
FIGS. 3A and 3B are plan views of a capacitance forming part in the chip component, taken along line B-B' of FIG. 1.
Figure 3B:
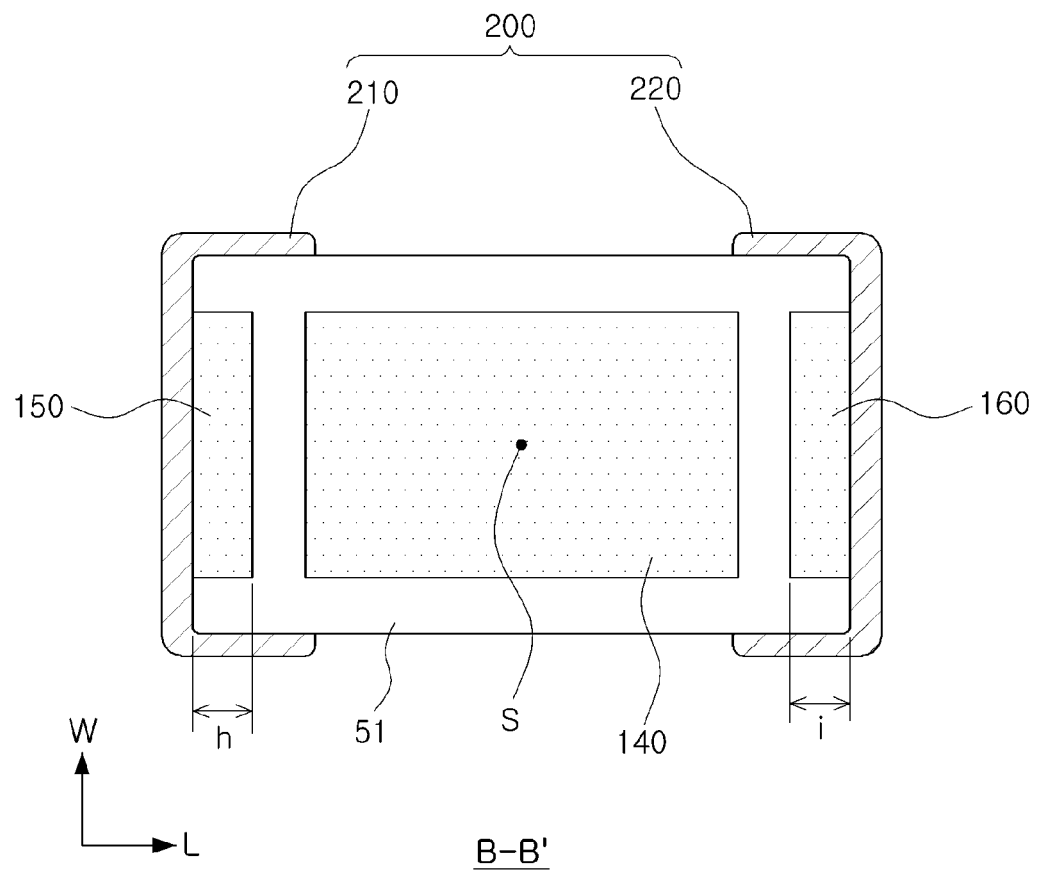

FIGS. 3A and 3B are plan views of a capacitance forming part C in the chip component, taken along line B-B' of FIG. 1.

FIG. 3A is a view illustrating the first to third internal electrodes 110 to 130 disposed on the first dielectric layer 50.

Referring to FIG. 3A, the first to third internal electrodes 110 to 130 may have a rectangular shape based on a stacked direction of the ceramic body 100, but are not limited thereto. In addition, widths of the first to third internal electrodes 110 to 130 are not limited to those illustrated in FIG. 3A.

The third internal electrode 130 may be disposed at the central portion S of the ceramic body 100 in the length direction thereof, and may be spaced apart from the first and second internal electrodes 110 and 120 by a predetermined distance. In addition, electricity having different polarities may be applied to the first and second internal electrodes 110 and 120 through the first and second external electrodes 210 and 220.

Meanwhile, a length d of each of the first and second internal electrodes 110 and 120 in the length direction of the ceramic body 100 may be longer than a length a of a portion of each of the first and second external electrodes 210 and 220 extended to at least one or the upper and lower surfaces of the ceramic body 100.

In more detail, the length d of each of the first and second internal electrodes 110 and 120 in the length direction of the ceramic body 100 may satisfy $1.1*a<=d<(g-b)/2$.

In addition, the first and second internal electrodes 110 and 120 may be generally formed by printing pastes containing a conductive metal, a binder, and a solvent on a ceramic green sheet and then firing the pastes.

As the conductive metal, nickel (Ni), a nickel alloy, or the like, may be used. A conductive paste for an internal electrode may further contain a ceramic inhibitor, for example, barium titanate.

The barium titanate may raise a sintering start temperature of the internal electrode to inhibit excessive grain growth. As the binder, a polymer resin such as polyvinylbutyral, ethylcellulose, or the like, may be used. An example of the solvent may include terpineol, dihydroterpineol, butylcarbitol, kerosene, or the like, but is not limited thereto.

FIG. 3B is a view illustrating the floating electrode 140 and the fourth and fifth dummy electrodes 150 and 160 disposed on the second dielectric layer 51.

Referring to FIG. 3B, the floating electrode 140 and the fourth and fifth dummy electrodes 150 and 160 may have a rectangular shape based on the stacked direction of the ceramic body 100, but are not limited thereto. In addition, widths of the floating electrode 140 and the fourth and fifth dummy electrodes 150 and 160 are not limited to those illustrated in FIG. 3B.

However, a length of the floating electrode 140 in the length direction of the ceramic body 100 may be large enough for the floating electrode 140 to have portions overlapped with each of the first and second internal electrodes 110 and 120 (See FIG. 2).

In addition, the floating electrode 140 may be formed at the central portion S of the ceramic body 100 in the length direction thereof, and be disposed to be spaced apart from the fourth and fifth dummy electrodes 150 and 160 by a predetermined distance to thereby be electrically separated from the first and second external electrodes 210 and 220.

On the other hand, the fourth and fifth dummy electrodes 150 and 160 may be electrically connected to the first and second external electrodes 210 and 220, respectively.

Figure 4:
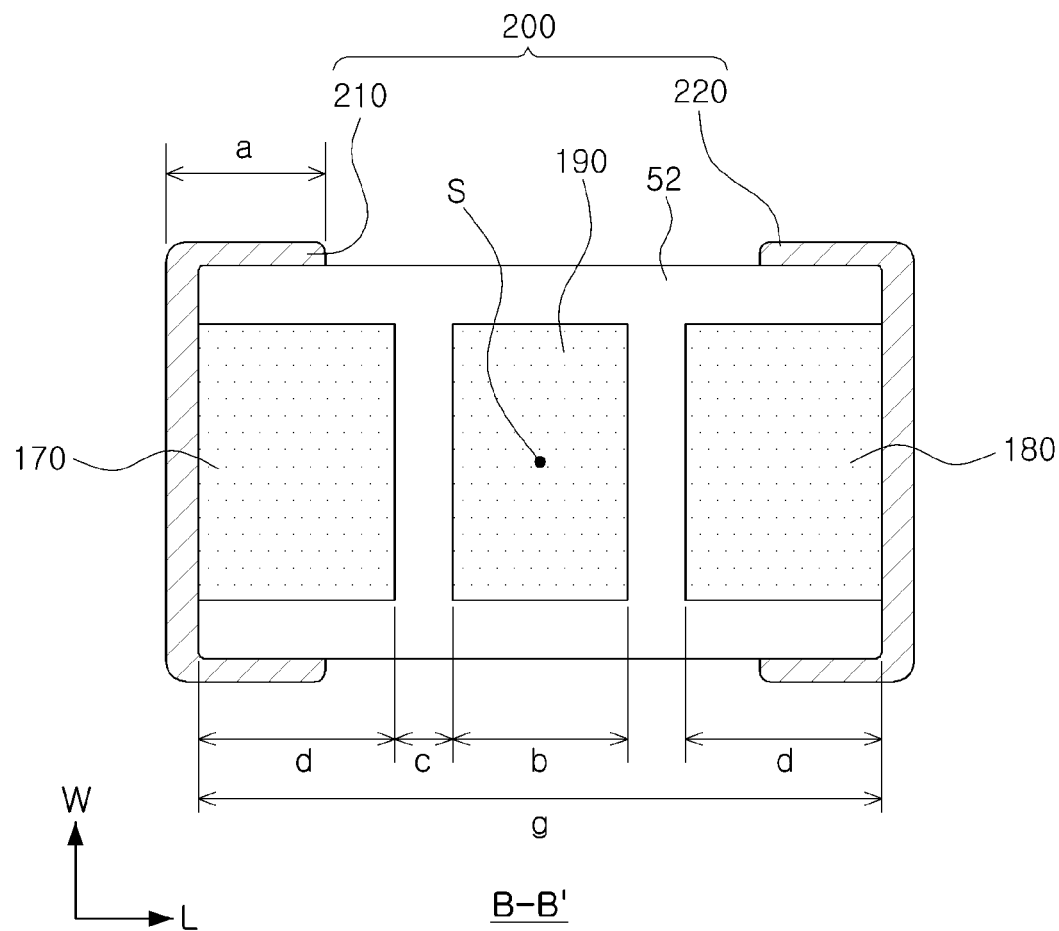
FIG. 4 is a plan view of protective parts in the chip component, taken along line B-B' of FIG. 1.

FIG. 4 is a plan view of protective parts P1 and P2 in the chip component, taken along line B-B' of FIG. 1.

Referring to FIG. 4, the protective parts P1 and P2 may be formed by stacking the plurality of third dielectric layers 52 on which the first to third dummy electrodes 170 to 190 are disposed.

Referring to FIG. 4, the first to third dummy electrodes 170 to 190 may have a rectangular shape based on the stacked direction of the ceramic body 100, but are not limited thereto. In addition, widths of the first to third dummy electrodes 170 to 190 are not limited to those illustrated in FIG. 4.

The third dummy electrode 190 may be disposed at the central portion S of the ceramic body 100 in the length direction thereof, and may be spaced apart from the first and second dummy electrodes 170 and 180 by a predetermined distance.

Particularly, the third dummy electrode 190 may be disposed at the central portion S of the ceramic body 100 in the length direction thereof to increase warpage strength, whereby the strength decrease phenomenon generated due to the step problem of the high multilayer ceramic capacitor may be prevented.

When a length b of the third dummy electrode 190 in the length direction of the ceramic body 100 may be large enough to be bisected to lengths h and i (See FIG. 3B) of the fourth and fifth dummy electrodes 150 and 160 in the length direction of the ceramic body 100. That is, the length b of the third dummy electrode 190 in the length direction of the ceramic body 100 may satisfy $0<b<g-d$.

Figure 5:
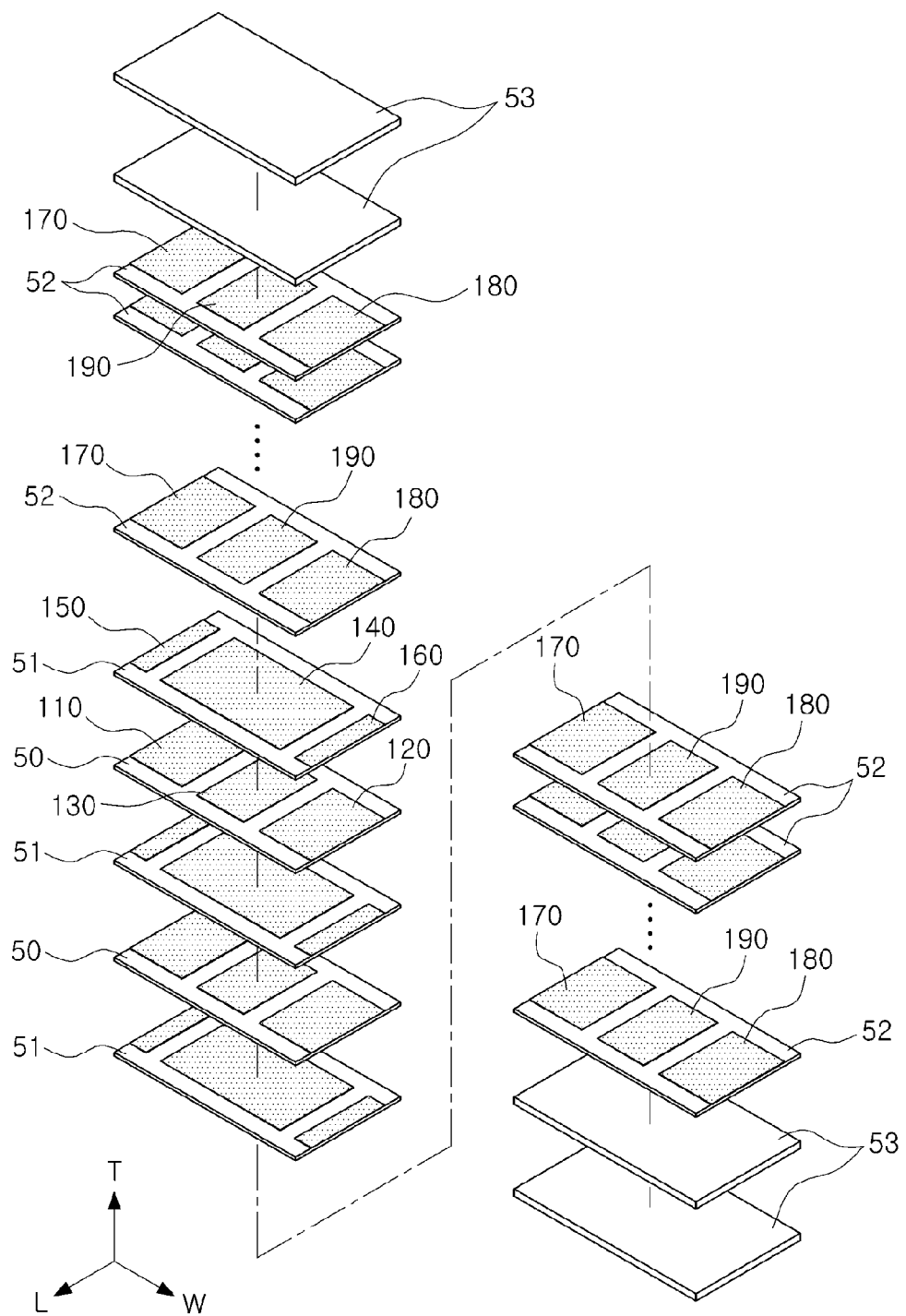
FIG. 5 is an exploded perspective view of the chip component according to the exemplary embodiment of the present disclosure.

FIG. 5 is an exploded perspective view of the chip component according to the exemplary embodiment of the present disclosure.

Referring to FIG. 5, the chip component according to the exemplary embodiment of the present disclosure may be formed by stacking the capacitance forming part C (See FIG. 2) in which the plurality of first and second dielectric layers 50 and 51 are alternately formed and the first and second protective parts P1 and P2 (See FIG. 2) disposed on and beneath the capacitance forming part C (See FIG. 2), respectively, and having the third dielectric layers 52, as described above.

Further, referring to FIG. 5, in a length-thickness cross section of the chip component according to the present disclosure, parts in which the first and second internal electrodes 110 and 120 or the first to third dummy electrodes 170 to 190 are not formed may be defined as margin parts.

Here, margin parts positioned in an upper portion and a lower portion of the ceramic body 100 in the thickness direction thereof may be defined as upper and lower margin parts.

The upper and lower margin parts may be formed by sintering the plurality of dielectric layers 53, similar to the first to third dielectric layers 50 to 52, and may have a structure similar to those of the first to third dielectric layers 50 to 52 except that the internal electrodes or the dummy electrodes are not formed.

The chip component according to the present disclosure may include the floating electrodes 140 formed in the capacitance forming part C to implement a high capacitance, and include the third dummy electrodes 190 disposed at the central portion C of the ceramic body 100 in the length direction thereof to prevent the strength decrease phenomenon generated in a high capacitance.

As set forth above, according to the exemplary embodiments of the present disclosure, the chip component capable of having a high capacitance and improving warpage strength by including the capacitance forming part having the floating electrodes and the protective parts having the dummy electrodes may be implemented.

While exemplary embodiments have been shown and described above, it will be apparent to those skilled in the art that modifications and variations could be made without departing from the scope of the present invention as defined by the appended claims.

What is claimed is:

1. A chip component comprising:
a ceramic body including a capacitance forming part in which a plurality of first and second dielectric layers are alternately disposed; and
external electrodes disposed on both end surfaces of the ceramic body in a length direction thereof,
wherein the capacitance forming part includes:
first and second internal electrodes disposed on the plurality of first dielectric layers to be spaced apart from each other and exposed to the end surfaces of the ceramic body to thereby be connected to the external electrodes;
floating electrodes disposed on the plurality of second dielectric layers and overlapped with portions of the first and second internal electrodes; and
protective parts disposed between at least one of upper and lower surfaces of the ceramic body and the capacitance forming part and having a plurality of third dielectric layers on which first, second, and third dummy electrodes are disposed,
wherein the first, second and third dummy electrodes are disposed on the same plane in the protective part, and the third dummy electrode is disposed between the first and second dummy electrodes,
the first and second dummy electrodes are exposed to the end surfaces of the ceramic body, and
a length of each of the first and second dummy electrodes in the length direction of the ceramic body is longer than a length of a portion of each of the external electrodes extended to at least one of the upper and lower surfaces of the ceramic body.

2. The chip component of claim 1, wherein the third dummy electrodes are positioned in a central portion of the ceramic body in the length direction thereof, and are disposed to be spaced apart from the first and second dummy electrodes.

3. The chip component of claim 1, wherein the protective parts include: a first protective part disposed between the upper surface of the ceramic body and the capacitance forming part; and
a second protective part disposed between the lower surface of the ceramic body and the capacitance forming part.

4. The chip component of claim 1, wherein the capacitance forming part further includes third internal electrodes positioned in a central portion of the ceramic body in the length direction thereof and disposed on the plurality of first dielectric layers to be spaced apart from the first and second internal electrodes.

5. The chip component of claim 1, wherein the capacitance forming part further includes fourth and fifth dummy electrodes exposed to the end surfaces of the ceramic body, respectively, and disposed on the plurality of second dielectric layers, and
the floating electrodes are positioned in a central portion of the ceramic body in the length direction thereof and are disposed to be spaced apart from the fourth and fifth dummy electrodes.

6. The chip component of claim 1, wherein the external electrodes are extended from the end surfaces of the ceramic body to at least one of the upper and lower surfaces of the ceramic body.

7. The chip component of claim 6, wherein a length of each of the first and second internal electrodes in the length direction of the ceramic body is longer than a length of a portion of each of the external electrodes extended to at least one of the upper and lower surfaces of the ceramic body.

8. A chip component comprising:
   a ceramic body including a capacitance forming part in which a plurality of first and second dielectric layers are alternately disposed, and first and second protective parts respectively disposed on one surface and the other surface of the capacitance forming part in a thickness direction thereof;
   first and second external electrodes disposed on both end surfaces of the ceramic body in a length direction thereof, respectively;
   first and second internal electrodes disposed on the plurality of first dielectric layers and exposed to the end surfaces of the ceramic body to thereby be connected to the first and second external electrodes, respectively; and
   floating electrodes disposed on the plurality of second dielectric layers and positioned in a central portion of the ceramic body in the length direction thereof to thereby be overlapped with portions of the first and second internal electrodes,
   wherein the first and second protective parts include a plurality of third dielectric layers on which first dummy electrodes positioned in the central portion of the ceramic body in the length direction thereof are disposed, the first dummy electrodes being overlapped with portions of the floating electrodes,
   the capacitance forming part further comprises a third internal electrode on the first dielectric layer,
   the third internal electrode is positioned in the central portion of the ceramic body in the length direction thereof, and
   the first, second, and third internal electrodes are disposed directly on the first dielectric layer.

9. The chip component of claim 8, wherein the first and second protective parts further include second and third dummy electrodes disposed on the plurality of third dielectric layers and exposed to the end surfaces of the ceramic body, and
   the first dummy electrodes are disposed between the second and third dummy electrodes to be spaced apart from the second and third dummy electrodes by a predetermined distance.

10. The chip component of claim 9, further comprising fourth and fifth dummy electrodes disposed on the plurality of second dielectric layers and exposed to the end surfaces of the ceramic body to thereby be connected to the first and second external electrodes, respectively.

11. The chip component of claim 10, wherein the second dummy electrodes are overlapped with portions of the floating electrodes and the fourth dummy electrodes, and
   the third dummy electrodes are overlapped with portions of the floating electrodes and the fifth dummy electrodes.

12. The chip component of claim 8, wherein the ceramic body has a lower surface provided as a mounted surface and an upper surface opposing the lower surface,
   the first protective part is disposed between the upper surface of the ceramic body and the capacitance forming part, and
   the second protective part is disposed between the lower surface of the ceramic body and the capacitance forming part.

13. The chip component of claim 8, wherein the third internal electrodes are overlapped with the first dummy electrodes.

14. The chip component of claim 8, wherein the first and second external electrodes are extended from the end surfaces of the ceramic body to at least one of upper and lower surfaces of the ceramic body, respectively.

15. The chip component of claim 8, wherein the first and second external electrodes are extended from the end surfaces of the ceramic body in the length direction thereof to both side surfaces of the ceramic body in a width direction thereof.

* * * * *